(12) United States Patent
Chiang et al.

(10) Patent No.: US 11,918,882 B2
(45) Date of Patent: Mar. 5, 2024

(54) INTERACTIVE EXERCISE APPARATUS FOR GUIDING PHYSICAL EXERCISES

(71) Applicant: Johnson Health Tech. Co., Ltd., Taichung (TW)

(72) Inventors: Hsin-Huang Chiang, Taichung (TW); Yu-Chieh Lee, Taichung (TW); Ning Chuang, Taichung (TW); Wei-Ting Weng, Taichung (TW); Cheng-Ho Yeh, Taichung (TW)

(73) Assignee: Johnson Health Tech Co., Ltd., Taichung (TW)

( * ) Notice: Subject to any disclaimer, the term of this patent is extended or adjusted under 35 U.S.C. 154(b) by 230 days.

(21) Appl. No.: 17/394,408

(22) Filed: Aug. 5, 2021

(65) Prior Publication Data

US 2022/0054925 A1 Feb. 24, 2022

(30) Foreign Application Priority Data

Aug. 19, 2020 (CN) .......................... 202010836985.7

(51) Int. Cl.
*A63B 71/06* (2006.01)
*A63B 24/00* (2006.01)

(52) U.S. Cl.
CPC ...... *A63B 71/0622* (2013.01); *A63B 24/0006* (2013.01); *A63B 2024/0015* (2013.01); *A63B 2071/0647* (2013.01); *A63B 2220/807* (2013.01); *A63B 2225/12* (2013.01)

(58) Field of Classification Search
None
See application file for complete search history.

(56) References Cited

U.S. PATENT DOCUMENTS

| | | | |
|---|---|---|---|
| 4,290,757 A * | 9/1981 | Marshall | F41G 3/2611 434/22 |
| 9,283,429 B2 | 3/2016 | Aragones et al. | |
| 10,356,493 B2 * | 7/2019 | Lewis | H04N 21/4782 |
| 2013/0171601 A1 * | 7/2013 | Yuasa | G06V 40/23 434/258 |
| 2015/0099252 A1 * | 4/2015 | Anderson | G06T 7/251 434/257 |
| 2020/0014967 A1 * | 1/2020 | Putnam | G09B 19/00 |

FOREIGN PATENT DOCUMENTS

WO WO-2019016406 A1 * 1/2019

* cited by examiner

*Primary Examiner* — Jay Trent Liddle
*Assistant Examiner* — Alyssa N Brandley

(57) ABSTRACT

An interactive exercise apparatus for guiding a user to perform an exercise includes a display device and a detecting device. The display device is configured to display video imagery which shows an instructor image and at least one motion check image. The motion check image corresponds to a predetermined one of a plurality of body parts of the user, which has a motion guide track and a motion achievement evaluation. The detecting device is configured to detect displacement of the body parts. The motion guide track is displayed on a predetermined position of the video imagery with a predetermined track pattern, corresponding to a movement path of the predetermined body part when the user follows movements demonstrated by the instructor image to perform the exercise. The motion achievement evaluation indicates a matching degree determined according to the displacement of the predetermined body part detected by the detecting device.

11 Claims, 6 Drawing Sheets

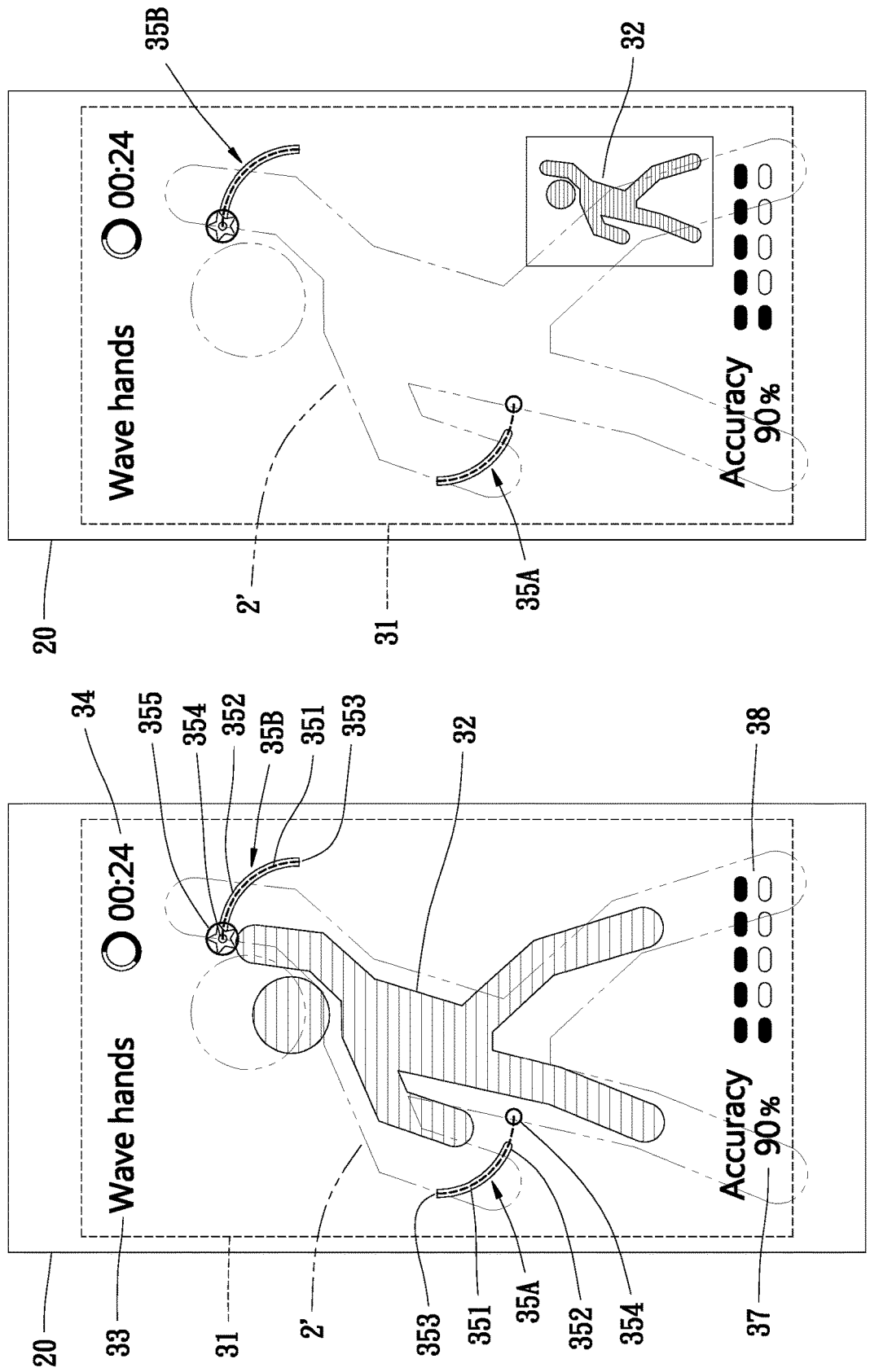

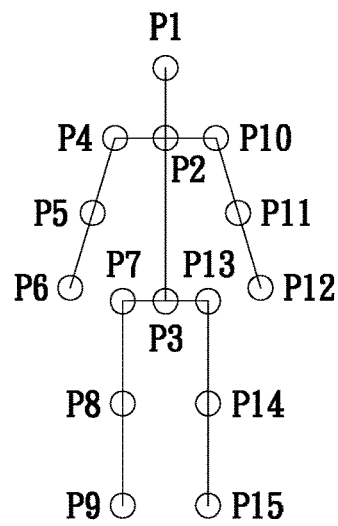
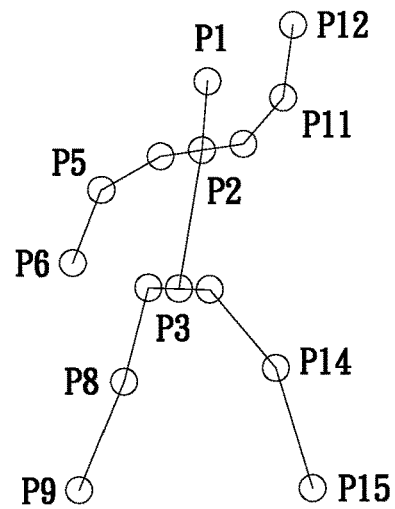
FIG. 4A  FIG. 4B
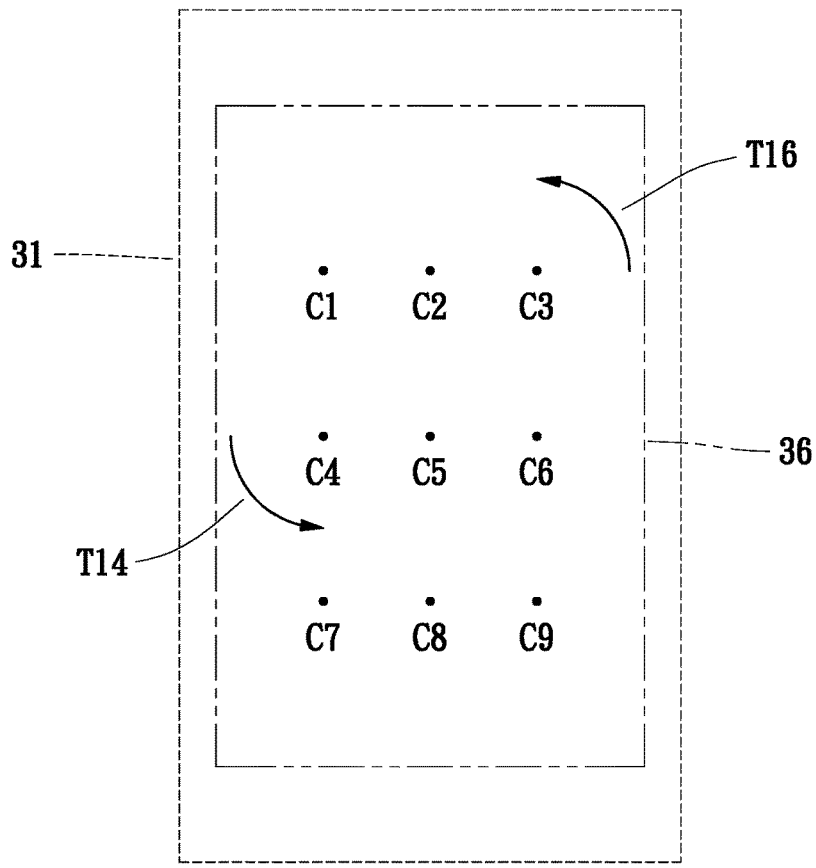
FIG. 5

INTERACTIVE EXERCISE APPARATUS FOR GUIDING PHYSICAL EXERCISES

BACKGROUND

1. Field of the Invention

The present invention relates to an interactive exercise apparatus. More particularly, the present invention relates to a mirror display device which is able to guide a user to perform exercises.

2. Description of the Related Art

Indoor exercise is becoming more and more popular in these days. More people are becoming aware of the need to exercise in order to maintain or improve their health and fitness. Since a person's schedule, weather, or other factors may prohibit the person from exercising outdoors, it is more convenient for the person to exercise indoors. Accordingly, indoor exercise apparatuses such as treadmills, stair exerciser apparatuses, steppers, exercise bikes provide such advantages for the person to use.

There is a smart mirror product on the market, which can display demonstration images on the mirror, as a fitness instructor provides real-time instructions. When the user stands in front of the fitness mirror, the user can see their mirror image and follow the demonstration images to perform workout, such that the user can correct their motion or posture immediately.

U.S. Pat. No. 9,283,429 discloses a method and apparatus for monitoring a user performing an exercise and generating a virtual avatar of the user and a virtual shadow. The virtual shadow illustrates a proper form of the exercise. It is capable of determining an amount of overlap between the virtual avatar and the virtual shadow, and generating a feedback score based on the amount of overlap. Furthermore, a virtual trainer may be displayed to instruct the user on how to perform the exercise.

The aforementioned guiding apparatus usually provides a number of physical exercises with different contents for users to choose according to their needs. It is conceivable that the service provider needs to construct a database of exercise programs containing a rich variety of physical exercises, and it is a complex and time-consuming task to create guidance for each movement action.

The present invention has arisen to mitigate and/or obviate the disadvantages of the conventional method. Further benefits and advantages of the present invention will become apparent after a careful reading of the detailed description with appropriate reference to the accompanying drawings.

SUMMARY

The present invention is directed to an interactive exercise apparatus for guiding a user to perform exercises, which can use interactive images containing movement guiding information to guide the user to perform a preset exercise. It is relatively simple and fast to set the movement guiding information into an exercise program in advance so as to reduce the cost of hardware devices and software development.

According to one aspect of the present invention, an interactive exercise apparatus for guiding a user to perform an exercise includes a display device, a detecting device, and a control unit. The display device is configured to display video imagery to the user. The video imagery shows an instructor image and at least one motion check image, which may be shown simultaneously during exercise, or which may be shown one after the other. The instructor image is configured to demonstrate movements of the exercise to allow the user to follow. The motion check image corresponds to a predetermined one of a plurality of body parts of the user. The motion check image has a motion guide track and a motion achievement evaluation. The detecting device is configured to detect displacement of the plurality of body parts of the user. The control unit is configured to read preset data which guides the user to perform the exercise, receive displacement data detected by the detecting device, and control display content on the display device. The preset data include demonstration content of the instructor image, a display timing of the motion check image, a preset body part corresponding to the respective motion check image, a preset display position and a preset pattern of each motion guide track. Specifically, the motion guide track is displayed at a predetermined position in a motion check area of the video imagery. The motion guide track is displayed with a predetermined track pattern, corresponding to a movement path of the predetermined body part when the user follows the movement demonstrated by the instructor image to perform the exercise. The motion achievement evaluation indicates a matching degree of the movement of the predetermined body part of the user with respect to the movement demonstrated by the instructor image. The matching degree of the movement is determined according to the displacement of the predetermined body part of the user detected by the detecting device.

The body parts of the user are generally located at a body center line, a left hand, a right hand, a left leg, or a right leg of the user. The motion guide track is based on a predetermined coordinate in the motion check area as a reference point of the display position. The predetermined coordinate is selected from a plurality of preset coordinates. The preset coordinates are disposed on a center of the motion check area, longitudinally disposed on a left region of the motion check area, and longitudinal disposed on a right region of the motion check area.

Preferably, the interactive exercise apparatus has a mirror disposed in front of the display device and the video imagery of the display device is visible through the mirror. The mirror is configured to reflect an image of the user opposite the mirror. When the interactive exercise apparatus guides the user to perform the exercise, the image of the user reflected by the mirror is superimposed on the motion check area of the video imagery.

Preferably, the motion guide track is based on a predetermined coordinate in the motion check area as a reference point of the display position, and the predetermined coordinate is selected from a plurality of preset coordinates. The predetermined track pattern of the motion guide track is selected from a plurality of preset patterns, including: an upward/downward vertical straight line from the reference point, a horizontal straight line from the reference point toward left/right, a straight line from the reference point toward the upper left/upper right/lower left/lower right, a quarter-circular arc with the reference point as a center and an arc notch toward upper left/upper right/lower left/lower right, and a semicircular arc with the reference point as a center and an arc notch toward up/down/left/right.

Preferably, the motion guide track has two opposite ends defined as a starting point and an end point, the motion guide track starting from the starting point to the end point in a direction corresponding to the movement path of the predetermined body part when the user follows the movement demonstrated by the instructor image to perform the exercise. The matching degree of the movement is determined according to the displacement including a displacement direction of the predetermined body part of the user detected by the detecting device.

Preferably, the motion achievement evaluation has a metering bar with a variable length. When performing the exercise, the higher the matching degree of the movement of the predetermined body part of the user with respect to the motion check image is, the longer the metering bar extends from the starting point along the motion guide track to the end point. When the metering bar extends from the starting point and reaches the end point of the motion guide track, an achieving indication will be displayed at the end point.

Further benefits and advantages of the present invention will become apparent after a careful reading of the detailed description with appropriate reference to the accompanying drawings.

BRIEF DESCRIPTION OF THE DRAWINGS

FIGS. 3A-3B illustrate example display content for guiding the user to perform an exercise;

FIGS. 4A-4B are schematic diagrams illustrating body parts that can be detected by a detecting device;

FIG. 5 illustrates preset coordinates of the preferred embodiment; and

DETAIL DESCRIPTION

Figure 1:
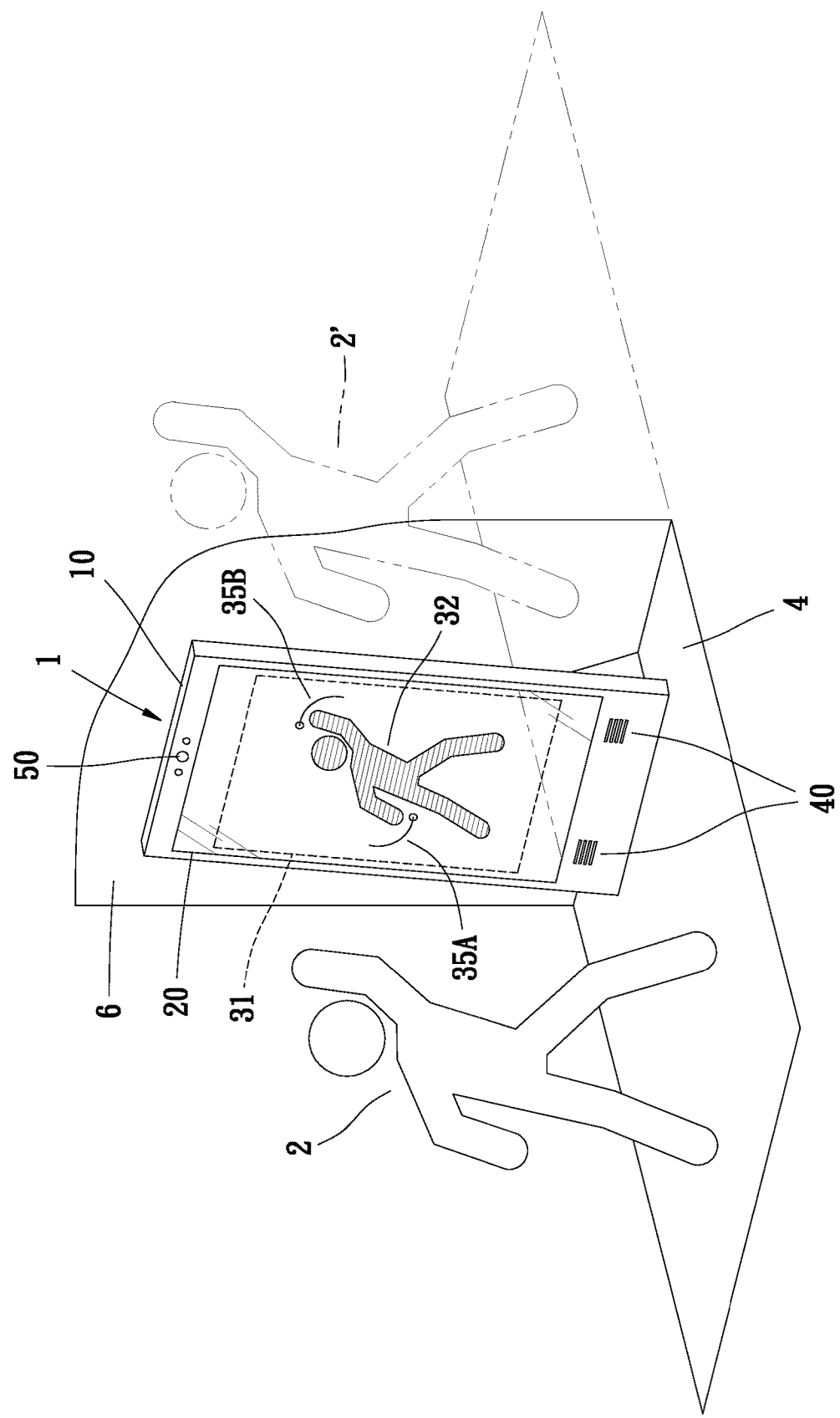
FIG. 1 is a schematic diagram illustrating an interactive exercise apparatus provided for guiding a user to perform a physical exercise in accordance with a preferred embodiment.
Figure 2:
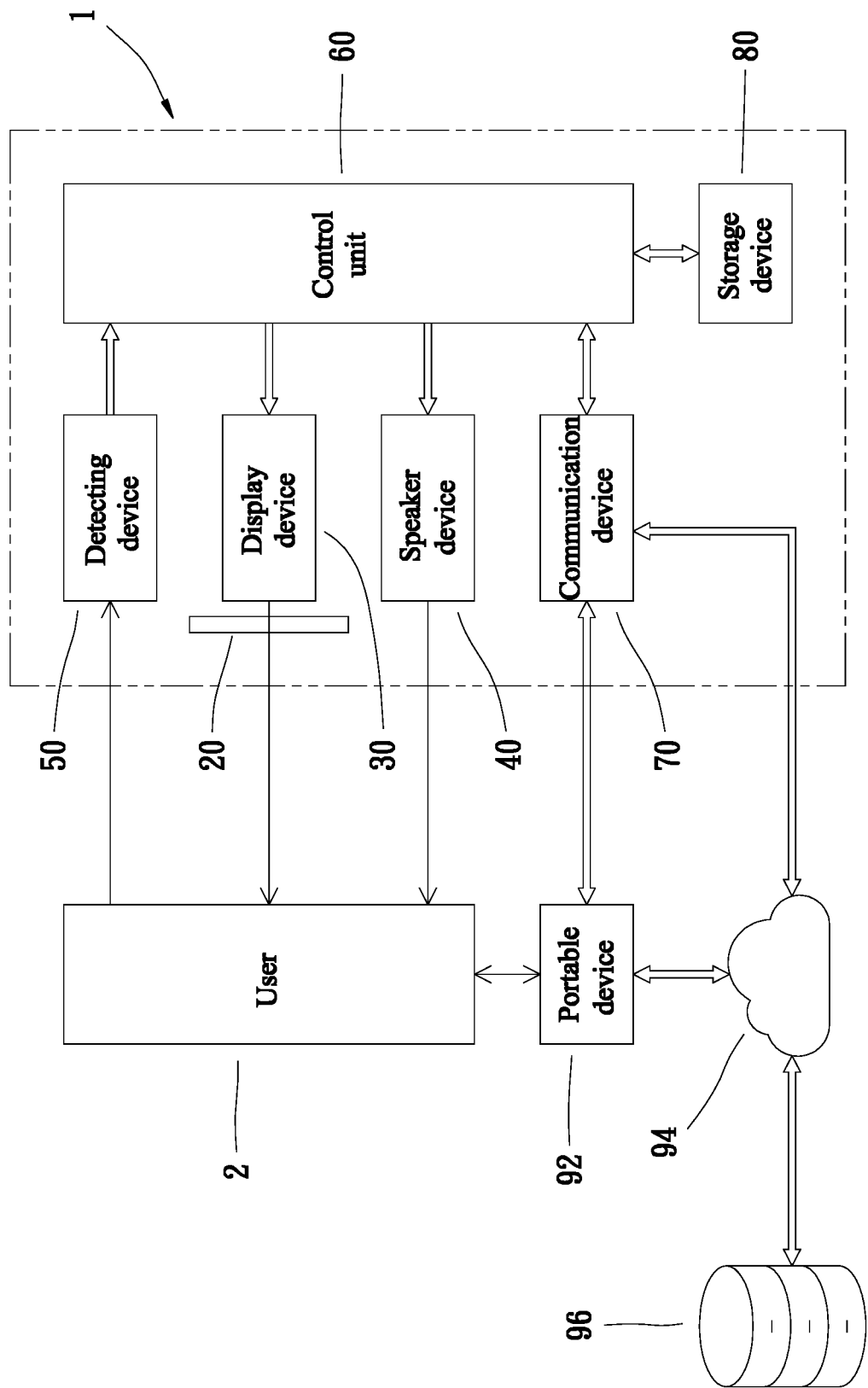
FIG. 2 is a block diagram illustrating a system configuration of the interactive exercise apparatus of the preferred embodiment.

Referring to FIG. 1 and FIG. 2, an interactive exercise apparatus 1 is illustrated in accordance with a preferred embodiment of the present invention. The interactive exercise apparatus 1 is a smart mirror provided for guiding a user 2 to perform exercises such as stretching, aerobic, yoga, boxing, Pilates, weight training, etc. The interactive exercise apparatus 1 includes a frame 10, a mirror 20 mounted on the frame 10 and a display device 30 disposed on the backside of the mirror 20. In the preferred embodiment, the frame 10 is a rectangular frame for supporting the mirror 20 and the display device 30. The frame 10 may stand on the ground, lean against the wall, or be hung, nailed or embedded in the wall. The mirror 10 is a half mirror or a transparent mirror or a two-way mirror having a partially reflecting section, such that the video content displayed on the display device 30 is visible through the mirror 20. The mirror 20 has appropriate length and width so that the user 2 standing within about 1 to 3 meters in front of the mirror 20 can see the mirror image 2' of their whole body through reflection of the mirror 20, as shown in FIG. 1 (note: the position of the mirror image 2' of the user 2 shown in FIG. 1 is a perceptual illusion). Depending on the setting method, the mirror surface of the mirror 20 may be perpendicular to the ground 4, or may have a slight inclined angle (e.g., about 10 degrees). In another embodiment, the mirror surface of the mirror 20 may be adjustable manually or automatically. For example, the mirror can be rotated about a horizontal pivot with respect to the frame, or the angle the frame can be adjusted.

As shown in FIG. 2 and referring to FIG. 1, the display device 30 is disposed on the backside of the mirror 20 and supported by the frame 10. Specifically, the display device 30 is a flat panel display such as a liquid crystal display, a plasma display, a light-emitting diode display. The display surface is flat or close to the backside of the mirror 20, which can display a full-color and high-resolution video imagery 31. The video imagery 31 has a longitudinal length shorter than the length of the mirror 20 and a width approximately equal to the width of the mirror 20. When the display device 30 is controlled to display the video imagery 31 with sufficient brightness, the user 2 facing the mirror 20 can see their mirror image reflected by the mirror 20 and the video imagery 31 transmitted through the mirror 20 simultaneously. In addition, the user 2 can see their mirror image 2' superimpose on the video imagery 31, as shown in FIG. 3A and FIG. 3B. Combining a half mirror with a display device to display video imagery in the mirror is well known in the art. For example, the so-called "smart mirror" has been widely used recently, and the technical details are omitted here.

Referring to FIG. 3A and FIG. 3B, when the interactive exercise apparatus 1 guides the user 2 to perform exercises, the video imagery 31 will show an instructor image 32. The instructor image 32 is provided to dynamically demonstrate movements of a physical exercise to allow the user 2 to follow or emulate. The instructor image 32 may be a real person in a pre-recorded video, a computer-generated animation, a real-time computing humanoid animation, or a few humanoid figures displayed in turn such as GIF animations. Considering the intuition of the user 2 emulating the instructor image 32 to perform the physical exercise, the instructor image 32 displayed in the video imagery 31 usually presents a front full-body posture. In other words, the instructor image 32 and the user 2 facing the video imagery 31 are interacting as if they were face-to-face. For example, when the instructor image 32 raises the left hand, it will induce the user 2 to raise the right hand, so that the user 2 sees their own mirror image as if imitating the posture of the instructor image 32. Of course, depending on demonstration needs, sometimes other perspectives or viewpoints such as back, side, or partial enlargement of the instructor image 32 may be briefly displayed or additionally displayed, such as showing the side view of squat movements. The size and position of the instructor image 32 can be selected by the user 2 according to personal preference. FIG. 3A illustrates a display mode that the instructor image 32 is relatively large and located in the central area of the video imagery 31, such that the instructor image 32 usually overlaps the mirror image 2' of the user 2'. FIG. 3B illustrates another display mode that the instructor image 32 is relatively small and located close to a corner of the video imagery 31 to avoid or reduce the overlap with the mirror image 2' of the user 2'.

As an example, as shown in FIG. 3A and FIG. 3B, the video imagery 31 may display the action name 33 of an ongoing exercise action and the remaining time 34 at appropriate positions, and may also display the action name of next exercise action, or the overall workout information of this exercise.

Referring to FIG. 1 and FIG. 2, the interactive exercise apparatus 1 has a detecting device 50 configured to detect displacement of a plurality of body parts of the user 2. The detecting device 50 is typically a camera device disposed on the top of the frame 10 of the interactive exercise apparatus 1 to continuously capture images in front of the interactive exercise apparatus 1 and to recognize the user's posture and movement in the captured images by using a specific image recognition technology. There are many algorithms directed to the aforementioned image recognition in the prior art. Most of the basic principles are to recognize or infer locations of main parts (called ""key points") of a human body such as the head, shoulders, elbows, wrists, knees, ankles, or the like, and then correctly connect them into a humanoid structure (called "skeleton") and continuously track displacement of each body part to get the posture and movement of the user in the image. In practice, the aforementioned detection function can be achieved by using an ordinary camera device that can only capture two-dimensional images with appropriate algorithms such as "OpenPose", but it may also be supplemented by a 3D sensing module that can sense the depth of the image (based on principle of "time of flight", "structured light", "stereo vision", etc.) to improve the accuracy of detection.

As shown in FIG. 4A, in the preferred embodiment of the present invention, the detecting device 50 can detect locations (or positions) and displacement of fifty fifteen body parts (or key points) of the human body, including the head P1, the top of the body P2, and the bottom of the body P3 located on the body centerline; the left shoulder P4, the left elbow P5, the left wrist P6, the left hip P7, the left knee P8, and the left ankle P9 located on the left half of the body; the right shoulder P10, the right elbow P11, the right wrist P12, the right hip P13, the right knee P14, and the right ankle P15 located on the right half of the body. In a simple mode, the detecting device 50 can be operable to detect locations and displacement of five body parts of the human body. The five body parts are respectively located on the body centerline (e.g. choosing one of the head P1, the top of the body P2, and the bottom of the body P3), the left hand (e.g. choosing one of the left elbow P5 and the left wrist P6), the left leg (e.g. choosing one the left knee P8 and the left ankle P9), the right hand (e.g. choosing one of the right elbow P11 and the right wrist P12), and the right leg (e.g. choosing one of the right knee P14 and the right ankle P15). As shown in FIG. 4B, the posture and/or movement of the user can be recognized by tracking the displacement of the aforementioned body parts. The key points in the figures may be connected to form the skeleton.

In another embodiment, the displacement of the body parts of the user may be detected by other devices and principles. For example, referring to the detection principles of various motion capture systems in the prior art, users can wear inertial sensors composed of accelerometers and gyroscopes on the head, limbs and/or other parts to directly obtain the information of movement direction and movement speed of each body part; or using a plurality of reflective markers attached to user's head and limbs cooperated with a corresponding camera device and the posture and movement of the user can be calculated based on locations of the markers in the image captured by the camera device. The motion capture or motion tracking system is well known in the art, which is not limited in the present invention.

Referring to FIG. 2, the interactive exercise apparatus 1 has a control unit 60 as a computing and control core which comprises a central processing unit or microprocessor in various computer devices. The control unit 60 is electrically connected to the display device 30, the speaker device 40 and the detecting device 50 so as to control the display content of the display device 30 and the voice content of the speaker device 40 and to receive detecting content of the detecting device 50. Furthermore, the control unit 60 is electrically connected to a storage device 80 (e.g., a hard disk drive, a solid state drive, random access memory). The storage device 80 is configured to store (temporarily and/or permanently) data including preset data for guiding the user to perform exercises or workout activities (namely exercise programs hereinafter), such as guiding videos of an instructor performing various exercises or workout activities. The control unit 60 is able to access the data stored in the storage device 80. The control unit 60 is also electrically connected to a communication device 70 such that the control unit 60 can be connected to an external network 94, including local area network (LAN) and wide area network (WAN), to download data from a local or remote database 96, including the exercise programs, and store (temporarily and/or permanently) in the storage device 80. Conversely, data can also be uploaded to the aforementioned database 96 via the network 94, such as uploading fitness data of users to store (temporarily and/or permanently) in the storage device 80. At the same time, the control unit 60 can be in communication with portable devices 92 (e.g. smart phones, smart watches, tablet computers, notebooks) via the communication device 70, forming a wired or wireless bidirectional communication connection, so as to transmit specific data to the portable device 92 and receive specific data from the portable device 92.

In the preferred embodiment of the present invention, the user 2 is able to input various commands to the interactive exercise apparatus 1 via the portable device 92. For example, the control unit 60 may transmit the menu data to the portable device 92 of the user 2 (generally processed by a specific application) to allow the user 2 to select a menu item using the portable device 92 and then transmit a corresponding command to the control unit 60. In another embodiment, the interactive exercise apparatus 1 may be provided with an input interface such as a control panel, a touch screen, a voice recognition system, a gesture recognition system, or the like, so that the user 2 is able to input commands by keys, touch, voice, or gesture control.

Referring to FIG. 3A and FIG. 3B, when the interactive exercise apparatus 1 guides the user 2 to perform exercises, the video imagery 31 will show at least one motion check image 35A/35B. The motion check images 35A, 35B may be displayed simultaneously with the instructor image 32, or these images may be shown at different times. For example, the motion check images 35A, 35B may appear after the instructor image 32 stops demonstrating or disappears. Each motion check image 35A/35B corresponds to a predetermined one of the body parts which can be detected by the detecting device 50. As shown in FIG. 3A, the motion check image 35A displayed at approximately the middle height on the left side of the video imagery 31 corresponds to the left wrist of the human body, namely P6 in FIG. 4A. As shown in FIG. 3A, the motion check image 35B displayed at a relative higher location on the right side of the video imagery 31 corresponds to the right wrist of the human body, namely P12 in FIG. 4A. Each motion check image 35A/35B has a motion guide track 351 and a motion achievement evaluation 352. The motion guide track 351 is displayed at a predetermined position in the video imagery 31 and presents a predetermined track pattern, such as a quarter-circular arc line illustrated in the figure, corresponding to a movement path of the predetermined body part of an exercise movement demonstrated by the instructor image 32 that the user 2 should perform at the same time. The motion guide track 351 is used to remind the user to pay attention to have each of the aforementioned predetermined body parts move referring to the corresponding motion guide track 351 while emulating the instructor image 32 to perform the physical exercise. In general, each exercise action can have one or more main body parts be accompanied by motion check images. It should be noted that the motion guide track 351 is just a reminder through its display position and representative track pattern. The motion guide track 351 does not precisely specify the spatial position, angle, arc, length, etc. of the movement path. In addition, the motion guide track 351 does not necessarily show the complete path of the movement path. Moreover, the motion guide track usually corresponds to the view point of the user 2, for example, when the instructor image 32 demonstrates that the hands are swinging up and down in front of the body (the actual movement path is similar to an arc), the corresponding motion guide track 351 may show a longitudinal straight line. Each motion check image 35A/35B is programed to correspond to a predetermined body part, and each motion guide track 351 is programed to correspond to a predetermined position and a predetermined track pattern, which are set in the aforementioned exercise program in advance.

Referring to FIG. 5, the video imagery 31 has a motion check area 36 that occupies approximately 80% area of the video imagery 31. Most of the mirror image 2' that the user 2 can see through the mirror 2 will be reflected in the motion check area 36, and all the aforementioned motion guide tracks 351 will be displayed in the motion check area 36. More specifically, each motion guide track 351 is based on a predetermined coordinate in the motion check area 36 as a reference point of the display position. The predetermined coordinate is previously selected from a plurality of preset coordinates and recorded in the aforementioned exercise program. In the preferred embodiment of the present invention, as shown in FIG. 5, there are nine preset coordinates C1 to C9, which are arranged in a 3×3 rectangular array. The coordinate C5 located at the center of the aforementioned array is set at the center of the motion check area 36. In other words, the left column, the right column and the middle column in the aforementioned array are respectively located in the left region, the right region and the central region of the motion check area 36, and each column has upper, middle and lower preset coordinates arranged vertically. In a simplified mode, there are only five preset coordinates, one of which is located at the center of the motion check area 36, two are located in the left region and arranged vertically at a relative higher position and a relative lower position, and the other two are located in the right region and arranged vertically at a relative higher position and a relative lower position.

The predetermined track pattern of the motion guide track 351 is also previously selected from a plurality of preset track patterns and recorded in the aforementioned exercise program. FIG. 6A to FIG. 6G illustrate all preset track patterns T1~T24 of the present embodiment. In terms of line shapes of the track patterns, the preset track patterns T1~T24 can be simply divided into five categories, including: longitudinal straight lines, horizontal straight lines, straight lines inclined at 45 degrees, quarter-circular arc lines, and semicircular arc lines. As mentioned before, each motion guide track 351 is based on a predetermined coordinate in the motion check area 36 as a reference point C of the display position, so that each of the preset track patterns is set to have a relative position with respect to the reference point C. Therefore, the preset track patterns T1~T24 can be further subdivided into: a longitudinal straight line T1/T5 displayed above/below the reference point C; a horizontal straight line T7/T3 displayed on the left/right of the reference point C; a 45-degree inclined straight line T8/T4 displayed on the upper left/lower right of the reference point C; a quarter-circular arc line T9 and T16/T10 and T15/T11 and T14/and T12 and T13 with the reference point C as a center and an arc notch toward lower left/upper left/upper right/lower right; and a semicircular arc line T17 and T20/T18 and T19/T22 and T24/T21 and T23 with the reference point C as a center and an arc notch toward left/right/top/bottom.

Specifically, each motion guide track 351 has two opposite ends defined as a starting point 353 and an end point 354. Generally, the starting point 353 and end point 354 can be distinguished. For example, the end point 354 of the motion guide track 351 shown in FIG. 3A has an obvious circular mark, and the motion guide track 351 may present a gradient color flowing from the starting point to the end point (not shown). The motion guide track 351 starts from the starting point 353 to the end point 354 in a direction corresponding to the movement path of the predetermined body part when the user 2 follows the movement demonstrated by the instructor image 32 to perform the exercise.

Figure 6A:
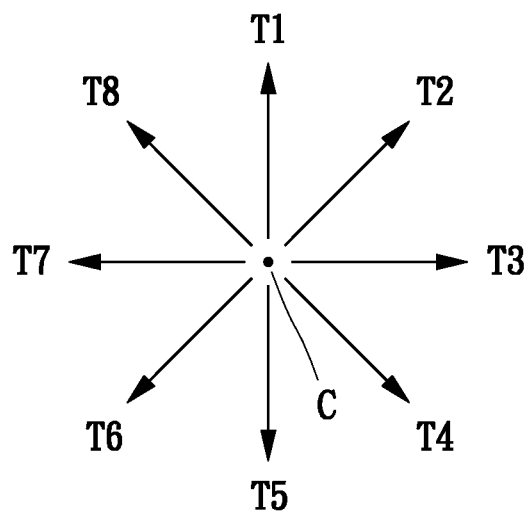
FIGS. 6A-6G illustrate preset track patterns of the preferred embodiment.
Figure 6B:
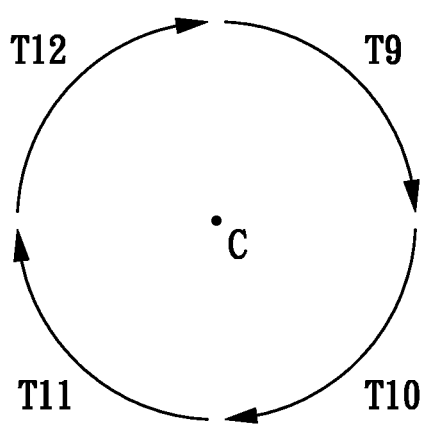
Figure 6C:
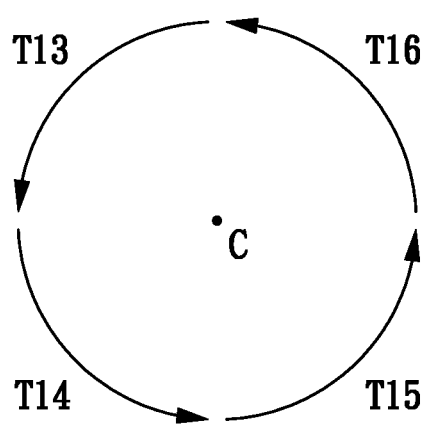
Figure 6D:
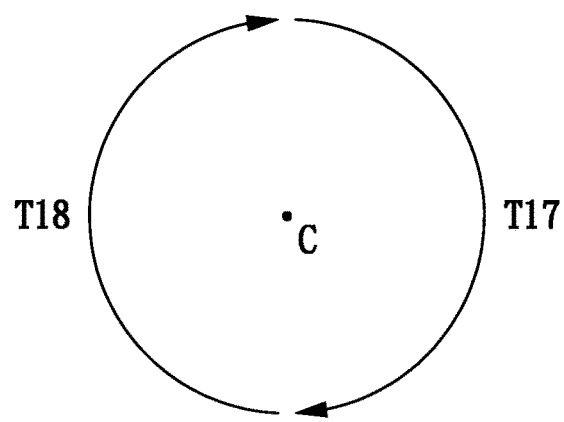
Figure 6E:
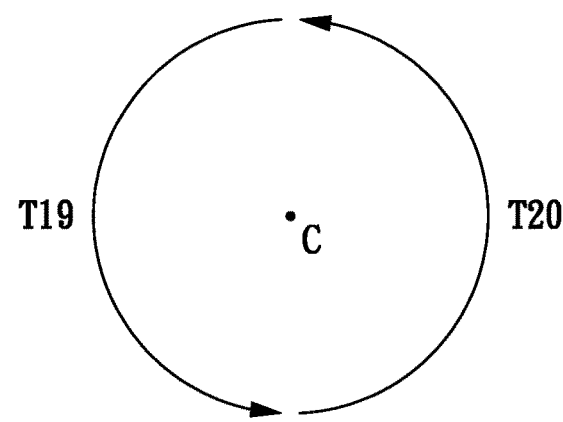
Figure 6F:
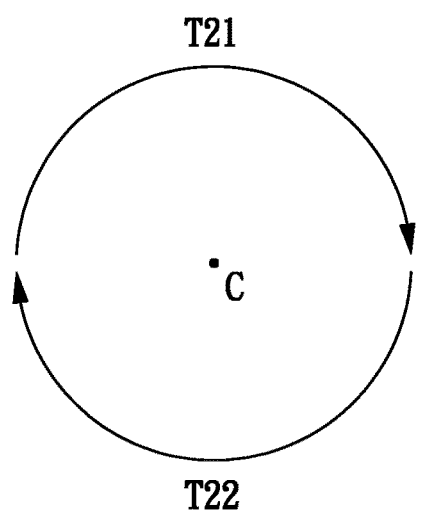
Figure 6G:
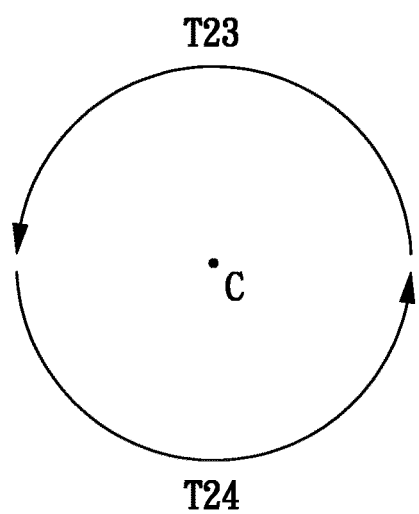

Accordingly, the preset track patterns T1~T24 include the following patterns. In FIG. 6A: a longitudinal straight line T1/T5 from bottom to top/from top to bottom; a horizontal straight line T7/T3 from right to left/from left to right; a 45-degree inclined straight line T8/T4 from lower right to upper left/from upper left to lower right; a 45-degree inclined straight line T2/T6 from lower left to upper right/from upper right to lower left. In FIG. 6B: a quarter-circular arc line T9/T10/T11/T12 from 12 o'clock position to 3 o'clock position/from 3 o'clock position to 6 o'clock position/from 6 o'clock position to 9 o'clock position/from 9 o'clock position to 12 o'clock position in a clockwise direction. In FIG. 6C: a quarter-circular arc line T13/T14/T15/T16 from 12 o'clock position to 9 o'clock position/from 9 o'clock position to 6 o'clock position/from 6 o'clock position to 3 o'clock position and from 3 o'clock position to 12 o'clock position in a counterclockwise direction. In FIG. 6D: a semicircular arc line T17/T18 from 12 o'clock position to 6 o'clock position and from 6 o'clock position to 12 o'clock position in a clockwise direction. In FIG. 6E: a semicircular arc line T19/T20 from 12 o'clock position to 6 o'clock position and from 6 o'clock position to 12 o'clock position in a counterclockwise direction. In FIG. 6F: a semicircular arc line T21/T22 from 9 o'clock position to 3 o'clock position and from 3 o'clock position to 9 o'clock position in a clockwise direction. In FIG. 6G: a semicircular arc line T23/T24 from 3 o'clock position to 9 o'clock position and from 9 o'clock position to 3 o'clock position in a counterclockwise direction.

As shown in FIG. 3A and referring to FIG. 5, the motion guide track 351 of the motion check image 35A displayed on the left side of the video imagery 31 at about the middle height is actually based on the coordinate C4 as the reference point of the display position, presenting a track pattern of a quarter-circular arc line T14 from 9 o'clock position to 6 o'clock position in a counterclockwise direction. The motion guide track 351 of the motion check image 35B on the right side of the video imagery 31 at a relative higher position is actually based on the coordinate C3 as the reference point of the display position, presenting a track pattern of a quarter-circular arc line T16 from 3 o'clock position to 12 o'clock position in a counterclockwise direction. In another embodiment, the motion guide track may not be directionally, such as a motion guide track for reciprocating movements along the same path.

In addition to the aforementioned preset track patterns T1~T24 shown in FIG. 6A to FIG. 6G, other shapes of track patterns are also allowed, such as elliptical arcs, L-shaped tracks, or the track pattern may be a closed track such as circle tracks or triangle tracks. Furthermore, in terms of visual effect, the aforementioned track patterns displayed in the video imagery is not necessarily a solid line continuous from one fixed point (e.g., the starting point) to another fixed point (e.g., the end point). It may be a dashed line, or showing a number of light dots flowing from one point to another point along a preset track or flowing back and forth between two points.

The motion achievement evaluation 352 of the motion check image 35A/35B indicates a matching degree of the movement of the predetermined body part of the user 2 with respect to the movement demonstrated by the instructor image 32 that the user 2 should perform at the same time. The matching degree of the movement is determined according to the displacement of the predetermined body part of the user 2 detected by the detecting device 50. Furthermore, the matching degree of the movement is determined based on the detecting result including the displacement direction of the predetermined body part of the user 2. For example, if the motion guide track 351 is directional, it will be determined whether the detected body part is moving along the corresponding track in the specified direction, and evaluated according to the degree of conformity or satisfaction of the shape, angle, arc, length, etc. of the actual movement path comparing to the preset movement path. If the motion guide track 351 is non-directional, it will be determined whether the detected body part is moving along the corresponding track only, regardless of the directionality. The aforementioned movement matching degree is to compare the detected actual movement path with the preset movement in the exercise program, which is intuitively similar to the matching degree of the movement path of the mirror image 2' that the user 2 can see through the mirror 2 with the corresponding motion guide track 351. In the preferred embodiment, the motion guide track 351 may only correspond to a part of the complete movement path, namely the detecting device 50 only detects whether the user 2 has performed the main section of the complete movement path.

In the preferred embodiment, the motion achievement evaluation 352 is specifically presented by a metering bar with a variable length. When performing exercises, the higher the matching degree of the movement of the predetermined body part of the user 2 with respect to the motion check image 35A/35B is, the longer the metering bar extends from the starting point 353 along the motion guide track 351 to the end point 354. When the metering bar (namely the motion achievement evaluation 352) extends from the starting point 353 and reaches the end point 354 of the motion guide track 351, an achieving indication 355 will be displayed at the end point 354. In another embodiment, the motion achievement evaluation may be presented in other forms, such as a numerical system with a full score of 100, or a rating system as S(excellent), A(good), B(acceptable), C(poor), etc. As shown in FIGS. 3A and 3B, an overall evaluation 37 will be displayed in an appropriate position of the video imagery 31. The overall evaluation 37 is determined based on the aforementioned motion achievement evaluations 352 of all motion check images 35A, 35B in the video imagery 31. If an exercise action is required to repeat several times, a count indicator 38 will be displayed in the video imagery 31, and each action has a corresponding overall evaluation 37.

In practice, each physical exercise or workout is made up of several exercise sections, and each exercise section has at least one check period. Each exercise program includes: demonstration content of body movements demonstrated by the instructor image in each exercise section, the number of the preset motion check images in each check period of the respective exercise section, the predetermined body part corresponding to each motion check image, the corresponding data of the predetermined display position and the predetermined track pattern of each motion guide track. When the interactive exercise apparatus 1 guides the user 2 to perform an exercise, during the check period of each exercise section, the video imagery 31 will display the predetermined motion check image for the check period.

In another embodiment, the interactive exercise apparatus 1 has a camera device configured to capture an image of the user in front of the interactive exercise apparatus 1 and to display a real-time image in the motion check area 36 of the video imagery 31. The real-time image is mirrored from the original image captured by the camera device, such that the user watching himself (or herself) in the aforementioned real-time image is similar to watching himself (or herself) through the mirror.

Under this arrangement, the interactive exercise apparatus 1 is capable of guiding a user 2 to perform a predetermined exercise through the video imagery 31 which contains the instructor image 32 and the motion check images 35A, 35B. The aforementioned motion guide track 351 of each motion check image 35A/35B is directly displayed in the video imagery 31 at a predetermined position and presenting a predetermined track pattern according to the settings in the exercise program, and it is not changed due to the user's body shape, position, motion, etc., so that the image display has no need to rely on complex detection and calculation. Moreover, it is relatively simple and fast to set the aforementioned motion check images for various motions when creating an exercise program so as to reduce the cost of hardware devices and software development.

According to embodiments, the efficacy can be achieved by the present invention, including:

A. The interactive exercise apparatus 1 can guide the user to perform physical exercises (including full-body movement). During exercise, the user can visually recognize the corresponding body part through the display position and track pattern of each motion guide track 351 that are set appropriately in advance.

B. The user can visually recognize the corresponding body part through the relative position of each motion guide track 351 and their mirror image.

C. The user can visually recognize the corresponding body part through the relative position of each motion guide track 351 and their real-time image.

D. It is relatively simple to set appropriate motion guide tracks 351 for various motions of each body part when creating an exercise program.

E. When the motion guide tracks 351 and the motion achievement evaluations 352 are provided with directionality, the motion check images 35A, 35B are much clearer, the evaluation is much stricter, and the guidance is higher.

F. The user can intuitively recognize the degree of conformity of one body part with the corresponding movement path by the metering bar.

G. The user can easily know whether the movement of one body part meets the required standard and being motivated.

H. The exercise actions of various physical exercises each can be encoded to form an exercise program.

I. It can better guide the user to perform more complex physical exercises, and the user can know the overall conformity of their movements compared to the demonstration movements.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interactive exercise apparatus for guiding a user to perform an exercise, comprising:
    a display device configured to display video imagery to the user, the video imagery defining a motion check area and showing an instructor image and at least one motion check image which may be shown simultaneously during exercise, or which may be shown one after the other, the instructor image configured to demonstrate movements of the exercise to allow the user to follow the demonstrated exercise movements, the at least one motion check image corresponding to a predetermined one of a plurality of body parts of the user, and the at least one motion check image having a motion guide track and a motion achievement evaluation;
    a detecting device configured to detect displacement of the plurality of body parts of the user; and
    a control unit configured to read preset data which guides the user to perform the exercise, receive displacement data detected by the detecting device, and control display content on the display device;
    wherein the motion guide track is displayed at a predetermined position in the motion check area of the video imagery with a predetermined track pattern, corresponding to a movement path of the predetermined body part when the user follows the movement demonstrated by the instructor image to perform the exercise; and wherein the motion achievement evaluation indicating a matching degree of the movement of the predetermined body part of the user with respect to the movement demonstrated by the instructor image that the user should perform at the same time, the matching degree of the movement being determined according to the displacement of the predetermined body part of the user detected by the detecting device;
    wherein the predetermined position of the motion guide track is based on a predetermined coordinate in the motion check area selected from a plurality of preset coordinates, the preset coordinates are arranged in a rectangular array and longitudinally disposed on a left region; a central region and a right region of the motion check area, and the predetermined track pattern of the motion guide track is selected from a plurality of preset patterns.

2. The interactive exercise apparatus as claimed in claim 1, wherein the preset data includes one or more of the following: demonstration content of the instructor image, a display timing of the at least one motion check image, a preset body part corresponding to the respective at least one motion check image, and a preset display position and a preset pattern of the motion guide track.

3. The interactive exercise apparatus as claimed in claim 2, wherein the exercise is made up of several exercise sections, and each exercise section has at least one check period; the preset data includes at least one preset motion check image in each check period of each exercise section, the preset body part corresponding to the respective at least one motion check image, the preset display position and the preset track pattern of the respective motion guide track; and wherein when the interactive exercise apparatus guides the user to perform the exercise, during the check period of each exercise section, the video imagery will display the preset motion check image for the check period.

4. The interactive exercise apparatus as claimed in claim 1, wherein the detecting device is operable to detect locations and displacement of five body parts, and the five body parts are respectively located on a body centerline, a left hand, a right hand, a left leg, and a right leg, such that posture and movement of the user can be recognized by tracking the displacement of the aforementioned body parts.

5. The interactive exercise apparatus as claimed in claim 1, further comprising a mirror disposed in front of the display device and the video imagery of the display device being visible through the mirror, the mirror configured to reflect an image of the user opposite the mirror, wherein when the interactive exercise apparatus guides the user to perform the exercise, the image of the user reflected by the mirror is superimposed on the motion check area of the video imagery.

6. The interactive exercise apparatus as claimed in claim 1, wherein the detecting device comprises a camera device mounted on the interactive exercise apparatus, the camera device configured to capture an image of the user in front of the interactive exercise apparatus, wherein when the interactive exercise apparatus guides the user to perform the exercise, a real-time image is displayed in the motion check area of the video imagery, and the real-time image is mirrored from the image captured by the camera device.

7. The interactive exercise apparatus as claimed in claim 1, wherein the preset patterns include; an upward/downward vertical straight line from the reference point, a horizontal straight line from the reference point toward left/right, a straight line from the reference point toward upper left/upper right/lower left/lower right, a quarter-circular arc with the reference point as a center and an arc notch toward upper left/upper right/lower left/lower right, and a semicircular arc with the reference point as a center and an arc notch toward up/down/left/right.

8. The interactive exercise apparatus as claimed in claim 1, wherein the motion guide track has two opposite ends defined as a starting point and an end point, the motion guide track starting from the starting point to the end point in a direction corresponding to the movement path of the predetermined body part when the user follows the movement demonstrated by the instructor image to perform the exercise; and wherein the matching degree of the movement is determined according to the displacement including a displacement direction of the predetermined body part of the user detected by the detecting device.

9. The interactive exercise apparatus as claimed in claim 1, wherein the motion guide track has two opposite ends defined as a starting point and an end point; the motion achievement evaluation has a metering bar with a variable length; when performing the exercise, the higher the matching degree of the movement of the predetermined body part of the user with respect to the at least one motion check image is, the longer the metering bar extends from the starting point along the motion guide track to the end point.

10. The interactive exercise apparatus as claimed in claim 9, wherein when the metering bar extends from the starting point and reaches the end point of the motion guide track, an achieving indication will be displayed at the end point.

11. The interactive exercise apparatus as claimed in claim 1, wherein when the interactive exercise apparatus guides the user to perform the exercise, the video imagery will display a plurality of motion check images simultaneously, and an overall evaluation will be displayed in the video imagery, the overall evaluation being determined based on the motion achievement evaluation of all motion check images in the video imagery at that time.

* * * * *